(12) United States Patent
Richards et al.

(10) Patent No.: US 9,465,215 B2
(45) Date of Patent: Oct. 11, 2016

(54) LIGHTGUIDE WITH MULTIPLE IN-COUPLING HOLOGRAMS FOR HEAD WEARABLE DISPLAY

(71) Applicant: Google Inc., Mountain View, CA (US)

(72) Inventors: Evan M. Richards, Santa Clara, CA (US); John D. Perreault, Mountain View, CA (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 14/229,169

(22) Filed: Mar. 28, 2014

(65) Prior Publication Data

US 2015/0277116 A1   Oct. 1, 2015

(51) Int. Cl.
*G02B 27/01* (2006.01)

(52) U.S. Cl.
CPC ....... *G02B 27/0103* (2013.01); *G02B 27/0172* (2013.01); *G02B 2027/0138* (2013.01); *G02B 2027/0143* (2013.01); *G02B 2027/0174* (2013.01); *G02B 2027/0178* (2013.01)

(58) Field of Classification Search
CPC .............. G02B 27/103; G02B 27/017; G02B 27/0172; G02B 2027/0105; G02B 2027/0107; G02B 2027/0174
See application file for complete search history.

(56) References Cited

U.S. PATENT DOCUMENTS

| | | | |
|---|---|---|---|
| 5,455,693 A * | 10/1995 | Wreede | G02B 5/32 359/15 |
| 6,269,203 B1 * | 7/2001 | Davies et al. | 385/24 |
| 8,233,204 B1 | 7/2012 | Robbins et al. | |
| 8,446,675 B1 | 5/2013 | Wang et al. | |
| 2006/0092489 A1 | 5/2006 | Ingwall et al. | |
| 2006/0228073 A1 * | 10/2006 | Mukawa | G02B 6/0033 385/31 |
| 2009/0190222 A1 * | 7/2009 | Simmonds et al. | 359/567 |
| 2010/0157400 A1 | 6/2010 | Dimov et al. | |
| 2011/0241975 A1 | 10/2011 | Mukawa et al. | |
| 2012/0218481 A1 * | 8/2012 | Popovich et al. | 349/11 |
| 2013/0033756 A1 | 2/2013 | Spitzer et al. | |

(Continued)

FOREIGN PATENT DOCUMENTS

TW         201317628 A         5/2013

OTHER PUBLICATIONS

PCT/US2015/018991; PCT International Search Report and Written Opinion mailed May 29, 2015, 12 pages.

(Continued)

*Primary Examiner* — Thomas K Pham
*Assistant Examiner* — Cara Rakowski
(74) *Attorney, Agent, or Firm* — Blakely Sokoloff Taylor & Zafman LLP (57) ABSTRACT

An optical apparatus for a head wearable display includes a lightguide, in-coupling holograms, and an out-coupling optical element. The lightguide includes an in-coupling region for receiving display light into the lightguide, an out-coupling region for emitting the display light out of the lightguide, and a relay region for guiding a path of the display light from the in-coupling region to the out-coupling region. A first of the in-coupling holograms is disposed at the in-coupling region to redirect the path of the display light by a first angle. A second of the in-coupling holograms is disposed across from the first in-coupling hologram at the in-coupling region to redirect the path of the display light by a second angle such that the path of the display light enters a total internal reflection condition in the relay region after redirection by the first and second in-coupling holograms.

21 Claims, 7 Drawing Sheets

(56) References Cited

U.S. PATENT DOCUMENTS

2013/0155513 A1   6/2013   Mukawa et al.
2013/0342914 A1   12/2013  Mukawa

OTHER PUBLICATIONS

Kasai, I. et al., "A Forgettable Near Eye Display", Optics Technology Division, Minolta Co. Ltd., Japan, IEEE, 2000, pp. 115-118.
Cakmakci, O. et al., "Head-Worn Displays: A Review", IEEE, Journal of Display Technology, vol. 2, No. 3, Sep. 2006, pp. 199-216.
Mukawa, H. et al., "8.4: *Distinguished Paper*. A Full Color Eyewear Display using Holographic Planar Waveguides", SID Symposium Digest of Technical Papers, May 2008, vol. 39, Issue 1, pp. 89-92.
Homan, M., "The use of optical waveguides in Head Up Display (HUD) applications", Proc. of SPIE vol. 8736, 87360E-1, downloaded from: http://spiedigitallibrary.org/ on Aug. 9, 2013, 14 pages.
TW 104110123—First Office Action with English translation, mailed Aug. 1, 2016, 15 pages.

* cited by examiner

LIGHTGUIDE WITH MULTIPLE IN-COUPLING HOLOGRAMS FOR HEAD WEARABLE DISPLAY

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method of operation for a head wearable display including a lightguide with multiple in-coupling holograms are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
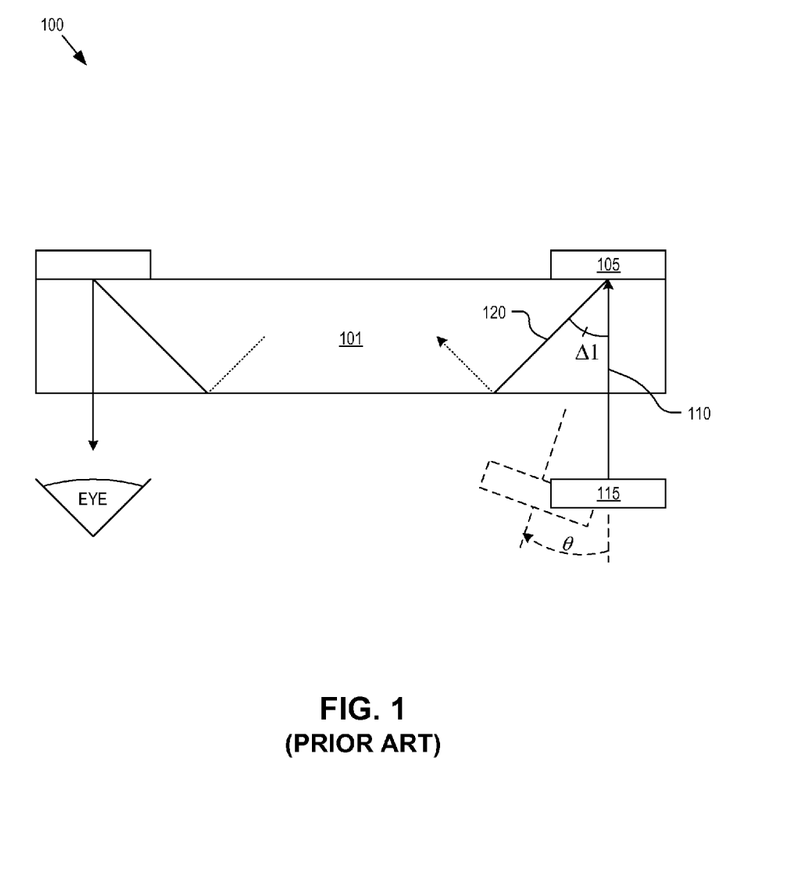
FIG. 1 illustrates a display with a single in-coupling reflection hologram having a given diffraction efficiency.

FIG. 1 illustrates a display 100 including a light guide 101 and a reflective in-coupling hologram 105 for coupling incident light 110 output from a display source 115 into lightguide 101. Display 100 includes a single in-coupling reflective hologram 105 that diffracts and reflects incident light 110 by 45 degrees so that the light can propagate down lightguide 101 via total internal reflection ("TIR"). Of course, other angles that result in TIR may be implemented as well. The in-coupling efficiency of display 100 is reduced due to the large angle $\Delta 1$ (e.g., 45 degrees) between the paths of the incident light 110 and diffracted light 120 that propagates down lightguide 101. The diffraction efficiency of a reflective hologram decreases with increasing angle $\Delta 1$ between the incident and diffracted beams. In general, diffraction efficiency is lowest when angle $\Delta 1$ is 90 degrees and increases when angle $\Delta 1$ moves away from the 90 degree scenario.

The efficiency of the in-coupling of incident light 110 can be increased by angling display source 115 by a few degrees θ to reduced angle $\Delta 1$. However, the amount of angling θ of display source 115 is limited. Angling display source 115 by θ "toes-in" or pushes display source 115 towards a user's temple region, which is often opposite of a desired direction for industrial design purposes. The temple arms of conventional eyewear typically toe-out towards the user's ears.

Figure 2:
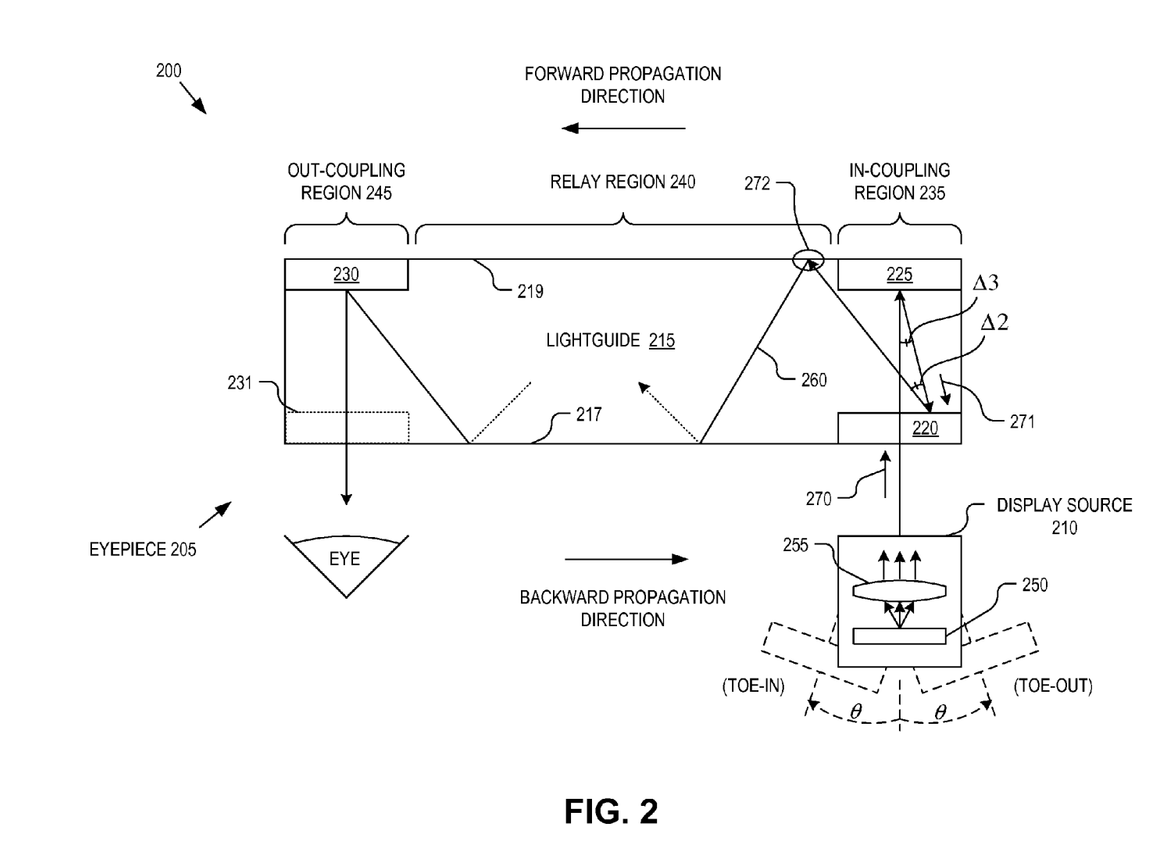
FIG. 2 illustrates a head wearable display having a lightguide with multiple reflection-mode in-coupling holograms, in accordance with an embodiment of the disclosure.

FIG. 2 illustrates a head wearable display 200 having a lightguide with multiple reflection-mode in-coupling holograms, in accordance with an embodiment of the disclosure. The illustrated embodiment of display 200 includes an eyepiece 205 and a display source 210. The illustrated embodiment of eyepiece 205 includes lightguide 215, in-coupling holograms 220 and 225, and out-coupling optical element 230. Lightguide 215 includes side surfaces 217 and 219, an in-coupling region 235, a relay region 240, and an out-coupling region 245. The illustrated embodiment of display source 210 includes a display panel 250 and a collimator 255.

In-coupling holograms 220 and 225 are positioned at the in-coupling region 235 of lightguide 215. In-coupling holograms 220 and 225 are reflection holograms that diffract and reflect incident light. Using two in-coupling holograms 220 and 225, versus a single in-coupling hologram 105, as illustrated in FIG. 1, serves to split the angular deviation across multiple holograms and thereby increases the overall diffraction efficiency of the in-coupling optical system. Furthermore, in-coupling holograms 220 and 225 are angularly sensitive and selective. Accordingly, in-coupling hologram 220 is configured to substantially pass display light 260 incident along normal direction 270, but reflects display light incident along oblique direction 271. Correspondingly, in-coupling hologram 225 is selective to reflect display light 260 that is incident along direction 270. This angular selectivity can be programmed into a volumetric hologram via appropriate orientation of object and reference wavefronts while writing a hologram, as is known in the art.

In-coupling holograms 220 and 225 operate to collectively redirect the path of display light 260 by a sufficient total angle to cause a total internal reflection ("TIR") condition at side surfaces 217 and 219 within relay region 240 to guide display light 260 from in-coupling region 235 to out-coupling region 245. Individually, in-coupling holograms 220 and 225 may not bend display light 260 by a sufficient angle to cause TIR, but collectively they do so, and potentially in a more efficient manner than single in-coupling hologram 105 (see FIG. 1) for a given total amount of redirection $\Delta 1$. The angles of redirection $\Delta 2$ and $\Delta 3$ imparted on the path of display light 260 by in-coupling holograms 220 and 225, respectively, are measured as the angle between an incident portion of display light 260 and a corresponding redirected (diffracted) portion of display light 260. Accordingly, in the illustrated embodiments, $\Delta 2 + \Delta 3 = \Delta 1$. In one embodiment, $\Delta 1 = 45$ degrees while $\Delta 2 = \Delta 3 = 22.5$. However, it should be appreciated that $\Delta 1$ need not be 45 degrees, but rather need only be sufficient to cause the path of display light 260 to reach the critical angle upon incidence with side surfaces 217 and 219 to result in TIR within relay region 240 of lightguide 215. Similarly, $\Delta 2$ need not equal $\Delta 3$, but rather collectively, $\Delta 2 + \Delta 3$ should be sufficient to cause TIR in relay region 240. The critical angle will be dependent upon the refractive index of the material selected for lightguide 215. Although not illustrated, the embodiments disclosed herein may be extended to include greater than two in-coupling holograms to further reduce the redirection angles per hologram to achieve a higher overall optical system efficiency.

Light guide 215 may be fabricated of glass, plastic, injection molded plastic, or other optically transmissive materials. In-coupling holograms 220 and 225 are disposed across from each other at the in-coupling region 235 in an opposing configuration. Although in-coupling holograms 220 and 225 are illustrated as embedded within (internally disposed) to lightguide 215 proximate to side surfaces 217 and 219, respectively, in-coupling holograms 220 and 225 may alternatively be surface mounted (externally disposed) proximate to side surfaces 217 and 291, respectively.

Out-coupling region 245 includes an out-coupling optical element 230 for redirecting display light 260 out of lightguide 215. Out-coupling region 245 may be implemented using a variety of different elements including a reflective hologram (illustrated), a beam splitter or polarizing beam splitter positioned obliquely across the out-coupling region 245 (not illustrated), or other refractive, reflective, or diffractive elements. Of course, out-coupling optical element 230 may also be implemented using multiple holograms using a similar configuration as the in-coupling region (e.g., out-coupling hologram 231).

Display source 210 may be implemented using a variety of different technologies for display panel 250, including liquid crystal displays ("LCD"), liquid crystal on silicon ("LCoS") displays, light emitting diode ("LED") displays, organic light emitting diode ("OLED") displays, pico-projectors, or other micro-display technologies. In many embodiments, display panel 250 will include a narrowband lamp, such as a laser, designed to work at a wavelength consistent with the design of in-coupling holograms 220 and 225. Since the in-coupling holograms 220 and 225 are angularly selective, display source 210 also includes a collimator 255 positioned to reduce the angular divergence of display light 260 emitted from display source 210. In some embodiments, collimator 255 may substantially collimate display light 260.

Eyepiece 205 is configurable to accept various different geometries for display source 210 relative to lightguide 215. In the illustrated embodiment, display source 210 is positioned to illuminate side surface 217 and in-coupling hologram 220 at a substantially normal angle. However, in other configurations display light 260 may be obliquely incident upon side surface 217 and in-coupling hologram 220, including both toe-in and toe-out configurations as called for by a particular industrial design. These toe-in and toe-out configurations can be accommodated via appropriate programming of the angular selectivity of in-coupling holograms 220 and 225.

Figure 3:
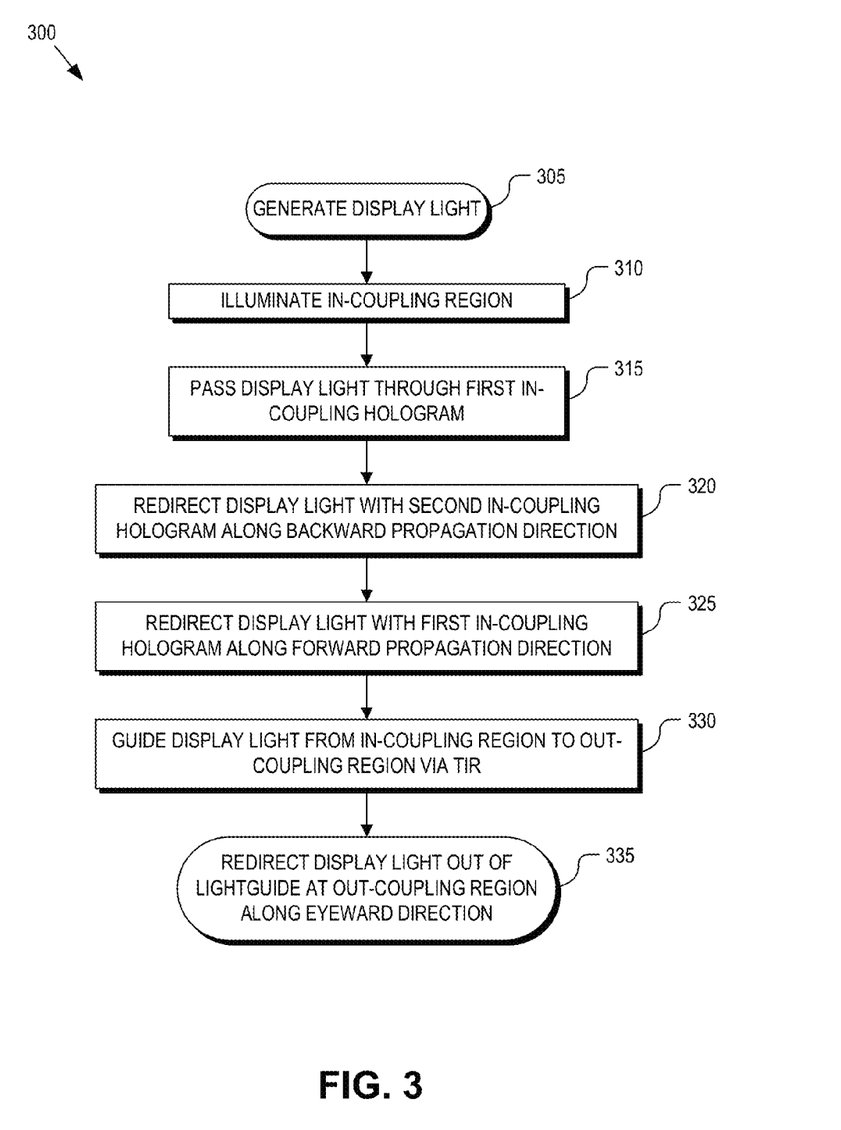
FIG. 3 is a flow chart illustrating a process of operation of an eyepiece having a lightguide with multiple in-coupling holograms, in accordance with an embodiment of the disclosure.

FIG. 3 is a flow chart illustrating a process 300 of operation of eyepiece 200, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, display source 210 generates display light 210. Display light 260 may be collimated light that illuminates side surface 217 at in-coupling region 235 (process block 310). Upon initial entry into lightguide 215, display light 260 passes through in-coupling hologram 220 since its angle selectivity is configured to substantially pass display light 260 traveling along direction 270 (process block 315).

Once display light 260 initially passes through in-coupling hologram 220, it travels across in-coupling region 235 of lightguide 215 and is incident upon in-coupling hologram 225, again along direction 270. However, the angle selectivity of in-coupling hologram 225 is configured to redirect display light 260 traveling along direction 270 by angle $\Delta 3$ to direction 271 (process block 320). Direction 271 places display light 260 at least temporarily on a backward propagation direction, moving away from out-coupling region 245. In other words, direction 271 includes a vector component that points away from out-coupling region 245.

Once again display light 260 travels across in-coupling region 235 and is incident upon in-coupling hologram 220, but this time along direction 271. Due to the angular selectivity of in-coupling hologram 220, display light 260 is redirected via reflective diffraction by angle $\Delta 2$, this time along a forward propagation direction moving towards out-coupling region 245 (process block 325). The collective redirections of angles $\Delta 3$ and $\Delta 2$ are sufficient to cause display light 260 to enter a TIR condition at location 272 on side surface 219 within relay region 240. In various embodiments, angles $\Delta 3$ and $\Delta 2$ can have substantially equivalent angular magnitudes, or have dissimilar angular magnitudes, but in either case collectively cause TIR in relay region 240.

In yet other embodiments, if relay region 240 is coated with a reflective layer (not illustrated) and does not rely upon TIR to guide display light 260, then angles Δ3 and Δ2 need not collectively be sufficient to cause TIR, but will still improve in-coupling efficiency, since the angular deviation is split between two in-coupling holograms.

Relay region 240 guides display light 260 from in-coupling region 235 to out-coupling region 245 via TIR (process block 330). Finally, in a process block 245, display light 260 is redirected out of lightguide 215 by out-coupling optical element 230 disposed at out-coupling region 245. As discussed above, out-coupling optical element 230 may be implemented using a variety of different elements, such as a one or two holograms, diffraction gratings, reflectors, beam splitters, polarizing beam splitters, or otherwise.

Figure 4A:
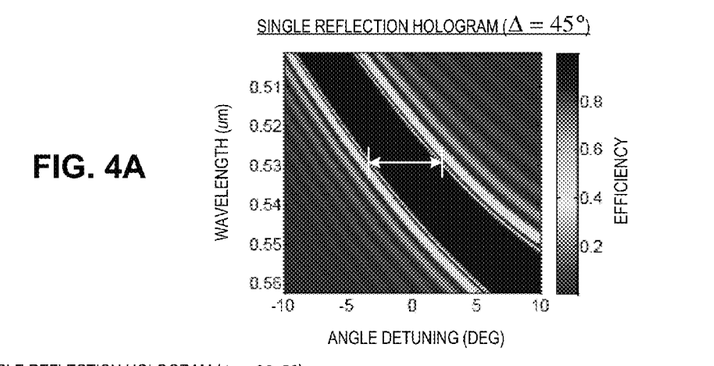
FIGS. 4A-4C include charts that compare the off-axis efficiency of single reflection holograms to dual-combined reflection holograms, in accordance with an embodiment of the disclosure.
Figure 4B:
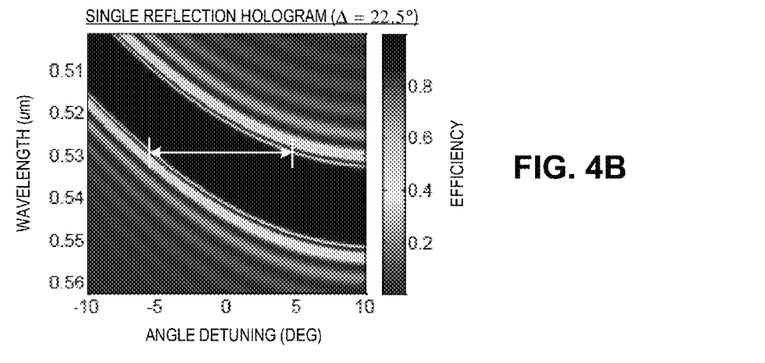
Figure 4C:
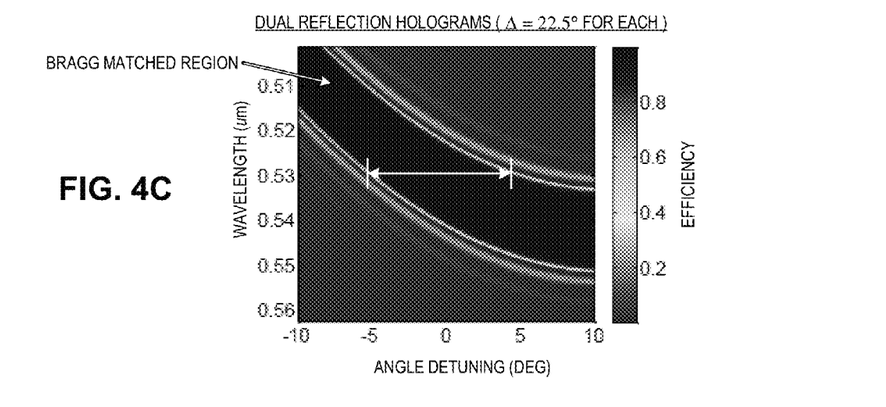

FIGS. 4A-4C include charts that compare the off-axis efficiency of single reflection holograms to dual-combined reflection holograms, in accordance with an embodiment of the disclosure. FIG. 4A illustrates the reflective diffraction efficiency over a range of angles detuned from the Bragg phase matched condition versus wavelength for a single reflection hologram configured for a redirection angle of Δ=45 degrees. As illustrated, at an example wavelength of 532 nm, the single reflection hologram only maintains greater than 80% efficiency for a relatively narrow range of angles of about +−4 degrees. In contrast, FIG. 4B illustrates the reflective diffraction efficiency for a single reflection hologram configured for a redirection angle of Δ=22.5 degrees. As illustrated, at the example wavelength of 532 nm, the single reflection hologram maintains greater than 80% efficiency for a much wider range of angles of about +−6 degrees. FIG. 4C illustrates the reflective diffraction efficiency for dual-combined reflection holograms each configured for a redirection angle of Δ=22.5 degrees and a combined redirection angle of 45 degrees. As illustrated, at an example wavelength of 532 nm, the dual-combined reflection hologram maintains greater than 80% efficiency for the wider range of angles of about +−6 degrees. Thus, when incorporating two in-coupling holograms that individually redirect incident light by half (e.g., 22.5 degrees), their combined angular efficiency remains substantially constant. Furthermore, the ringing outside the near-Bragg matched region is substantially reduced.

Figure 5:
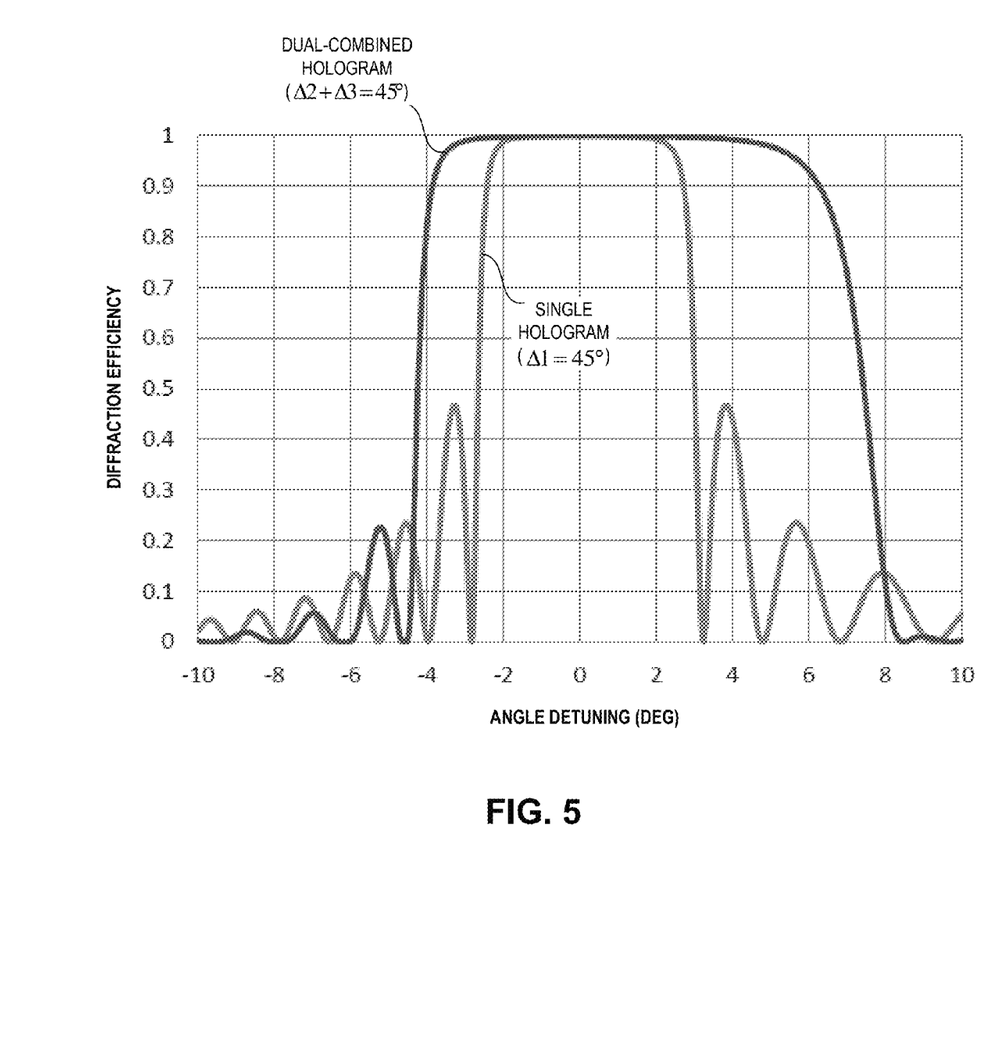
FIG. 5 is a chart illustrating the off-axis diffraction efficiency of single and dual-combined reflection holograms, in accordance with an embodiment of the disclosure.

FIG. 5 is a chart illustrating the off-axis diffraction efficiency comparing single and dual-combined reflection holograms, in accordance with an embodiment of the disclosure. Again, as illustrated, dual-combined reflection holograms have a broader angular response curve. This provides enhanced FOV performance and greater image uniformity for display 200 versus display 100.

Figure 6:
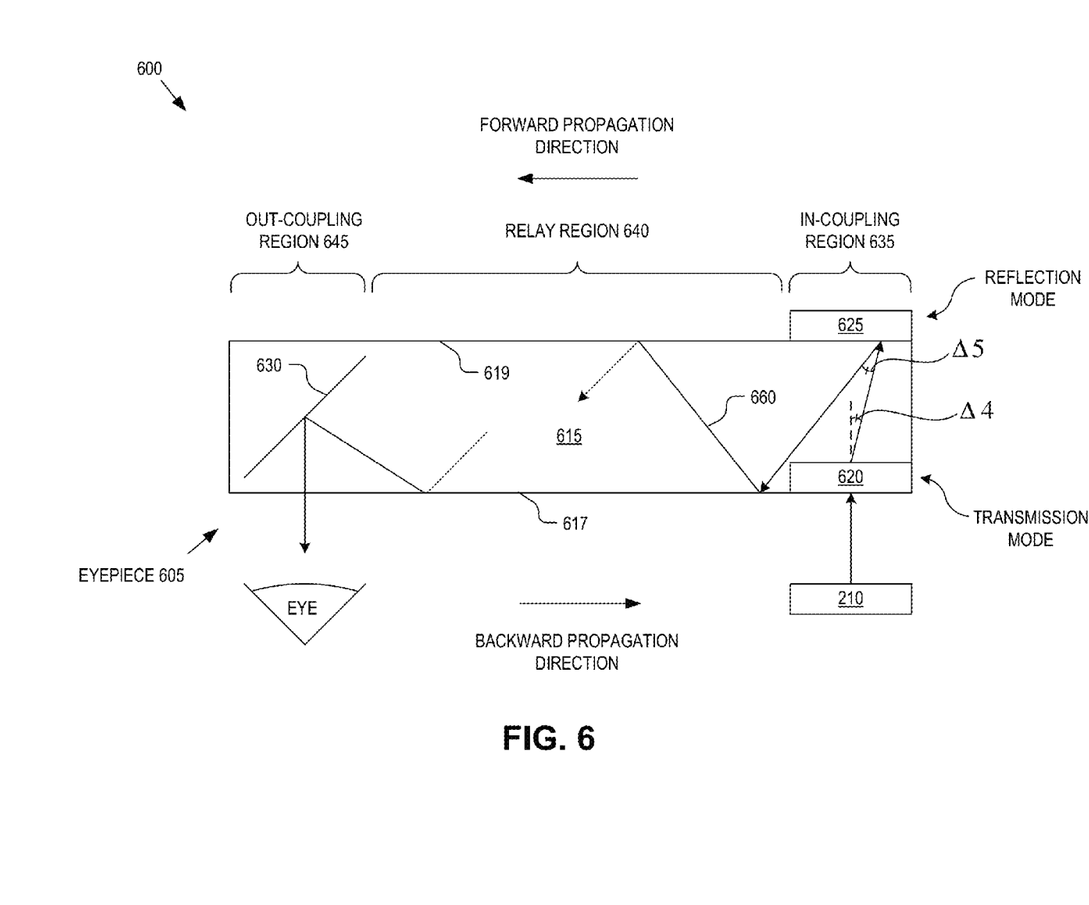
FIG. 6 illustrates a head wearable display having a lightguide with a transmission-mode in-coupling hologram and a reflection-mode in-coupling hologram, in accordance with an embodiment of the disclosure.

FIG. 6 illustrates a head wearable display 600 having a lightguide with a transmission-mode in-coupling hologram and a reflection-mode in-coupling hologram, in accordance with an embodiment of the disclosure. The illustrated embodiment of display 600 includes an eyepiece 605 and a display source 210. The illustrated embodiment of eyepiece 605 includes lightguide 615, in-coupling holograms 620 and 625, and out-coupling optical element 630. Lightguide 615 includes side surfaces 617 and 619, an in-coupling region 635, a relay region 640, and an out-coupling region 645.

In-coupling holograms 620 and 625 are disposed at the in-coupling region 635 of lightguide 615. Eyepiece 605 is similar to eyepiece 205, except that in-coupling holograms 620 is a transmission-mode hologram that re-directs display light 660 by angle Δ4 via transmissive diffraction while in-coupling hologram 625 is a reflection-mode hologram that re-directs display light 660 by angle Δ5 via reflective diffraction. In-coupling holograms 620 and 625 are angularly sensitive. Similar to eyepiece 205, in-coupling holograms 620 and 625 re-direct display light 660 in opposite directions. In-coupling hologram 630 redirects display light 660 by angle Δ4 along a backward propagation direction away from out-coupling region 645 and in-coupling region 635 redirects display light 660 by angle Δ5 along a forward propagation direction towards out-coupling region 645.

Out-coupling region 645 includes an out-coupling optical element 630 for redirecting display light 660 out of lightguide 615. Out-coupling region 645 may be implemented using a variety of different elements including a reflective hologram (not illustrated), a beam splitter (illustrated) or polarizing beam splitter positioned obliquely across the out-coupling region 645, or other refractive, reflective, or diffractive elements.

Figure 7:
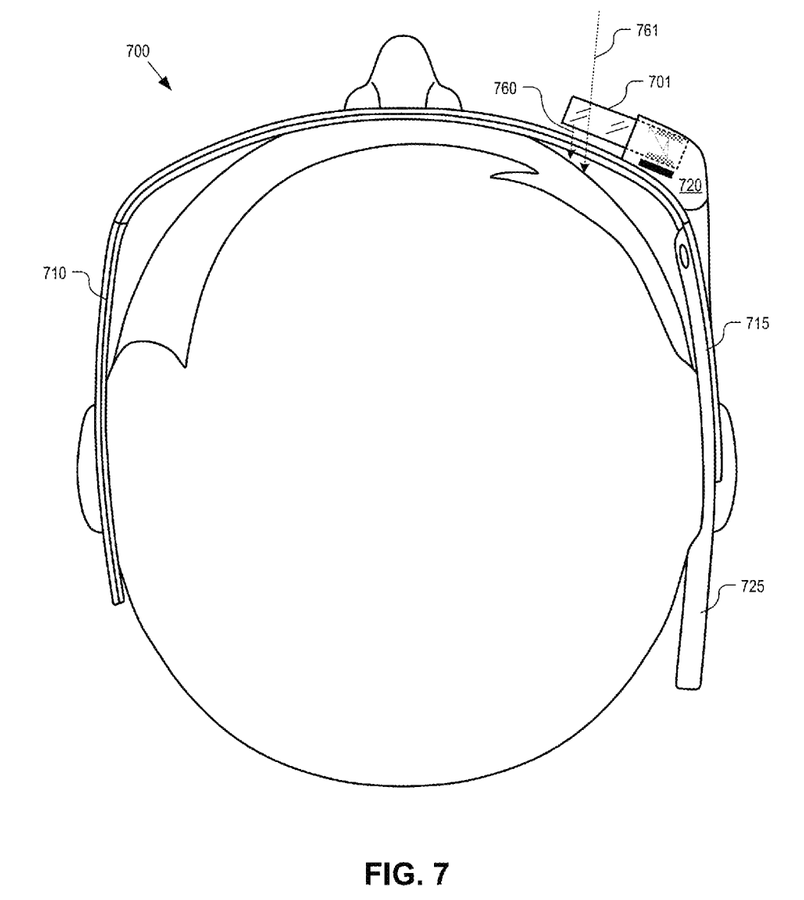
FIG. 7 illustrates a demonstrative head wearable display including an eyepiece with dual in-coupling holograms, in accordance with an embodiment of the disclosure.

FIG. 7 illustrates a monocular head wearable display 700 using an eyepiece 701, in accordance with an embodiment of the disclosure. Eyepiece 701 may be implemented with embodiments of eyepieces 200 or 600 as discussed above. Eyepiece 701 is mounted to a frame assembly, which includes a nose bridge 705, left ear arm 710, and right ear arm 715. Housings 720 and 725 may contain various electronics including a microprocessor, interfaces, one or more wireless transceivers, a battery, a camera, a speaker, etc. Although FIG. 7 illustrates a monocular embodiment, head wearable display 700 may also be implemented as a binocular display with two eyepieces 701 each aligned with a respective eye of the user when display 700 is worn.

The see-through piece 701 is secured into an eye glass arrangement or head wearable display that can be worn on the head of a user. The left and right ear arms 710 and 715 rest over the user's ears while nose bridge 705 rests over the user's nose. The frame assembly is shaped and sized to position the out-coupling region in front of an eye of the user. Other frame assemblies having other shapes may be used (e.g., traditional eyeglasses frame, a single contiguous headset member, a headband, goggles type eyewear, etc.).

The illustrated embodiment of head wearable display 700 is capable of displaying an augmented reality to the user. In see-through embodiments, eyepiece 701 permits the user to see a real world image via external scene light 761. Left and right (binocular embodiment) display light 760 may be generated by display sources 210 mounted in peripheral corners outside the user's central vision. Display light 760 is seen by the user as a virtual image superimposed over external scene light 761 as an augmented reality. In some embodiments, external scene light 761 may be fully, partially, or selectively blocked.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus for a head wearable display, the optical apparatus comprising:
a lightguide including:
a first side surface;
a second side surface;
an in-coupling region for receiving display light into the lightguide through the first side surface;
an out-coupling region for emitting the display light out of the lightguide; and
a relay region for guiding a path of the display light between the first and second side surfaces from the in-coupling region to the out-coupling region;
a first in-coupling hologram disposed proximate to the first side surface at the in-coupling region to redirect the path of the display light by a first angle;
a second in-coupling hologram disposed across from the first in-coupling hologram proximate to the second side surface at the in-coupling region to redirect the path of the display light by a second angle such that the path of the display light enters a total internal reflection ("TIR") condition in the relay region after redirection by the first and second in-coupling holograms, wherein the first and second in-coupling holograms are configured to redirect the display light along a backward propagation direction of a first dimension that moves away from the out-coupling region before redirecting the display light along a forward propagation direction of the first dimension that moves toward the out-coupling region, wherein the first dimension extends from the in-coupling region through the relay region to the out-coupling region; and
an out-coupling optical element disposed at the out-coupling region to redirect the display light out of the lightguide.

2. The optical apparatus of claim 1, wherein the first and second angles are measured between an incident portion of the display light and a corresponding redirected portion of the display light after being redirected by a given one of the first or second in-coupling holograms.

3. The optical apparatus of claim 2, wherein the first and second angles collectively redirect the path of the display light by a sufficient total angle to cause the TIR condition in the relay region but individually the first or second angles redirect the path by an insufficient angle to cause the TIR condition in the relay region.

4. The optical apparatus of claim 2, wherein the first and second angles have an equal angular magnitude.

5. The optical apparatus of claim 1, wherein the first and second in-coupling holograms comprise reflection holograms and wherein the first in-coupling hologram further comprises an angularly selective reflective hologram.

6. The optical apparatus of claim 5, wherein the second in-coupling hologram is configured to reflect and diffract the display light along the backward propagation direction that moves away from the out-coupling region while the first in-coupling hologram is configured to diffract and reflect the display light along the forward propagation direction that moves towards the out-coupling region.

7. The optical apparatus of claim 5, wherein the first in-coupling hologram is angularly selective to pass the display light entering into the lightguide through the first side surface but reflect the display light reflected to the first in-coupling hologram from the second in-coupling hologram.

8. The optical apparatus of claim 1, wherein the first in-coupling hologram comprises a transmission hologram and wherein the second in-coupling hologram comprises a reflection hologram.

9. The optical apparatus of claim 8, wherein the first in-coupling hologram is configured to transmissively diffract the display light along the backward propagation direction that moves away from the out-coupling region while the second in-coupling hologram is configured to reflectively diffract the display light along the forward propagation direction that moves towards the out-coupling region.

10. The optical apparatus of claim 1, further comprising:
a display source to generate the display light, wherein the display source is disposed to illuminate the first side surface at the in-coupling region of the lightguide with the display light,
wherein the display source is disposed in a toe-out orientation relative to the lightguide such that the display light obliquely enters into the lightguide.

11. The optical apparatus of claim 1, wherein the out-coupling optical element comprises at least one of an out-coupling hologram, a beam splitter, a polarizing beam splitter, a reflector, or a diffractive optical element.

12. The optical apparatus of claim 1, wherein the out-coupling optical element comprises:
a first out-coupling hologram disposed adjacent to the first side surface; and
a second out-coupling hologram disposed across from the first out-coupling hologram and adjacent to the second side surface.

13. The optical apparatus of claim 1, wherein the forward propagation direction and the backward propagation direction are both in a single plane for a single ray of the display light.

14. A head wearable display, comprising:
a display source to generate display light;
an eyepiece including:
a lightguide including an in-coupling region for receiving the display light into the lightguide, an out-coupling region for emitting the display light out of the lightguide, and a relay region for internally guiding a path of the display light from the in-coupling region to the out-coupling region;
a first in-coupling hologram disposed at the in-coupling region to redirect the path of the display light by a first angle; and
a second in-coupling hologram disposed across from the first in-coupling hologram at the in-coupling region to redirect the path of the display light by a second angle such that the path of the display light enters a total internal reflection ("TIR") condition in the relay region after redirection by the first and second in-coupling holograms; and
a frame assembly to support the display source and the eyepiece for wearing on a head of a user with the out-coupling region of the lightguide aligned in front of an eye of the user,
wherein the first and second angles are measured between an incident portion of the display light and a corresponding redirected portion of the display light after being redirected by a given one of the first or second in-coupling holograms,
wherein the first and second angles collectively redirect the path of the display light by a sufficient total angle to cause the TIR condition in the relay region but individually the first and second angles redirect the path by an insufficient angle to cause the TIR condition in the relay region, wherein the second in-coupling hologram is configured to reflect and diffract the display light along a backward propagation direction that moves away from the out-coupling region while the first in-coupling hologram is configured to diffract and reflect the display light along a forward propagation direction that moves towards the out-coupling region.

15. The head wearable display of claim 14, wherein the first and second angles have an equal angular magnitude.

16. The head wearable display of claim 14, wherein the first and second in-coupling holograms comprise reflection holograms and wherein the first hologram further comprises an angularly selective reflective hologram.

17. The head wearable display of claim 16, wherein the first in-coupling hologram is angularly selective to pass the display light entering into the lightguide but reflect the display light reflected to the first in-coupling hologram from the second in-coupling hologram.

18. A head wearable display, comprising:
a display source to generate display light;
an eyepiece including:
   a lightguide including an in-coupling region for receiving the display light into the lightguide, an out-coupling region for emitting the display light out of the lightguide, and a relay region for internally guiding a path of the display light from the in-coupling region to the out-coupling region;
   a first in-coupling hologram disposed at the in-coupling region to redirect the path of the display light by a first angle; and
   a second in-coupling hologram disposed across from the first in-coupling hologram at the in-coupling region to redirect the path of the display light by a second angle such that the path of the display light enters a total internal reflection ("TIR") condition in the relay region after redirection by the first and second in-coupling holograms; and
a frame assembly to support the display source and the eyepiece for wearing on a head of a user with the out-coupling region of the lightguide aligned in front of an eye of the user,
wherein the first and second angles are measured between an incident portion of the display light and a corresponding redirected portion of the display light after being redirected by a given one of the first or second in-coupling holograms,
wherein the first and second angles collectively redirect the path of the display light by a sufficient total angle to cause the TIR condition in the relay region but individually the first and second angles redirect the path by an insufficient angle to cause the TIR condition in the relay region,
wherein the first in-coupling hologram is configured to transmissively diffract the display light along a backward propagation direction that moves away from the out-coupling region while the second in-coupling hologram is configured to reflectively diffract the display light along a forward propagation direction that moves towards the out-coupling region.

19. The head wearable display of claim 18, wherein the display source comprises:
a display panel; and
a collimator aligned with an output of the display panel to reduce a divergence of the display light emitted from the display source into the lightguide.

20. The head wearable display of claim 19, wherein the display source is disposed in a toe-out orientation relative to the lightguide such that the display light obliquely enters into the lightguide.

21. The head wearable display of claim 18, wherein the first in-coupling hologram comprises a transmission hologram and wherein the second in-coupling hologram comprises a reflection hologram.

\* \* \* \* \*